Sept. 19, 1950            L. BUDD            2,522,744
SCOOTER
Filed Sept. 3, 1947            2 Sheets-Sheet 2
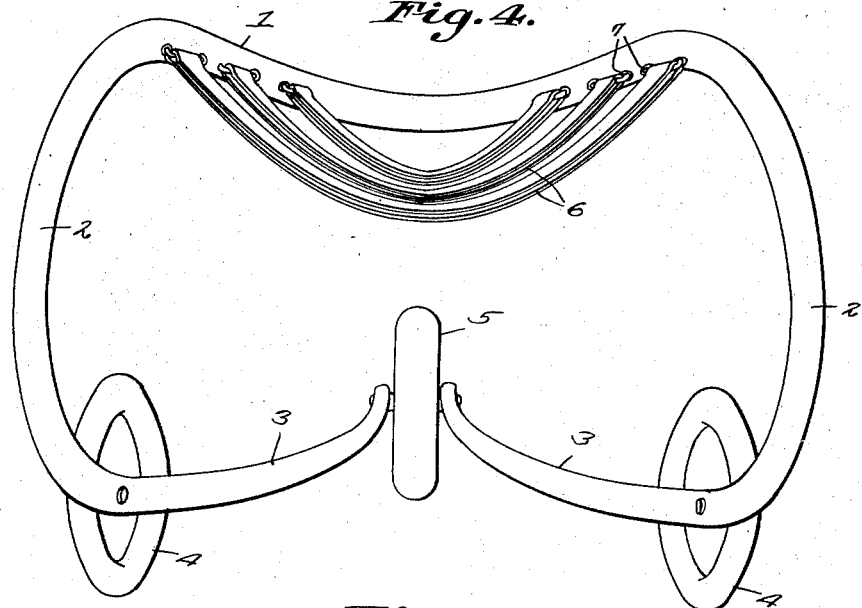
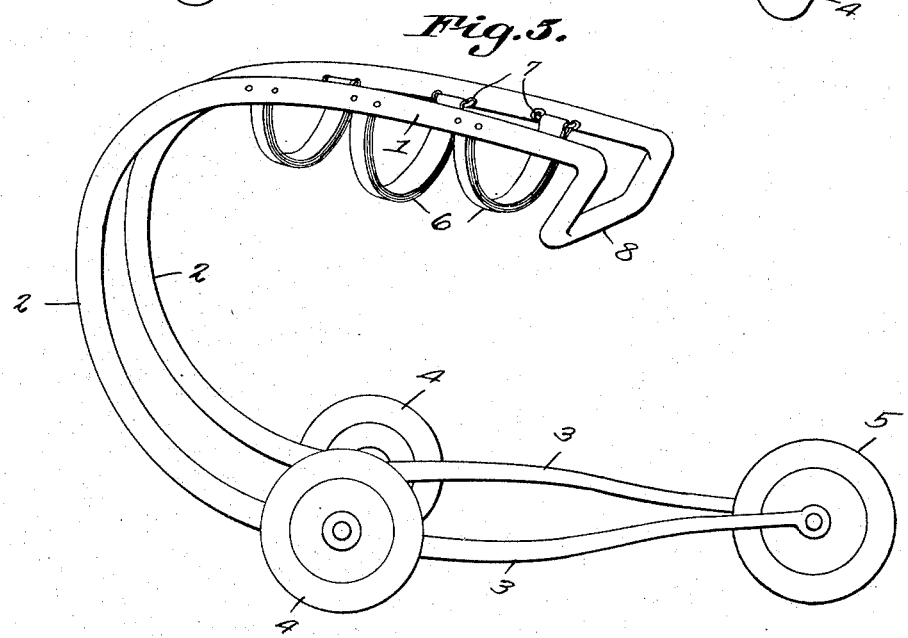
Leighton Budd
INVENTOR.
BY C. James Cottrell
ATTORNEY.

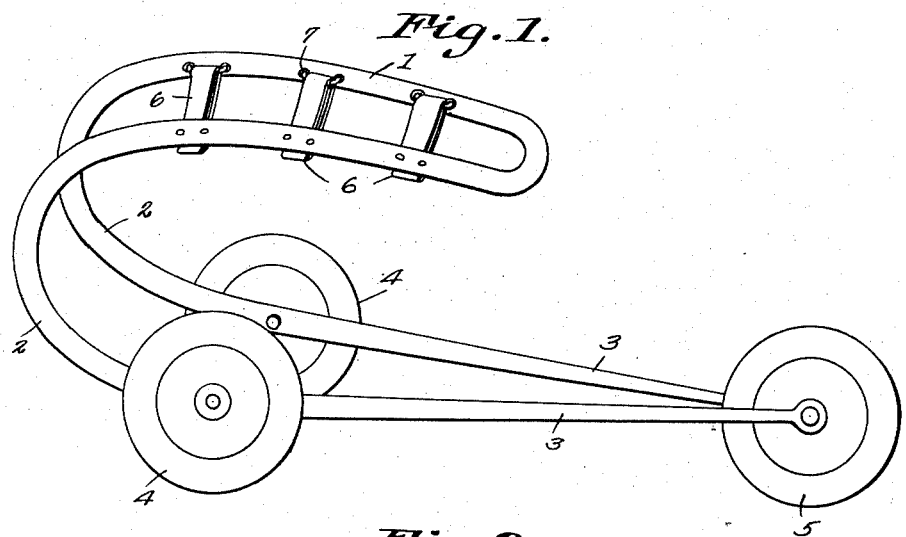
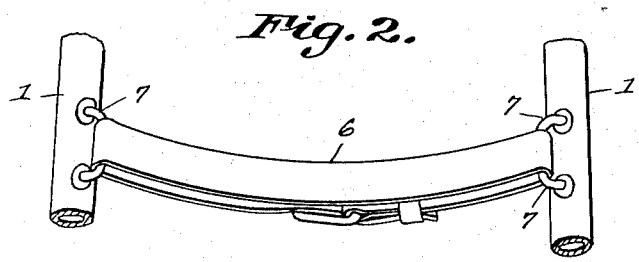
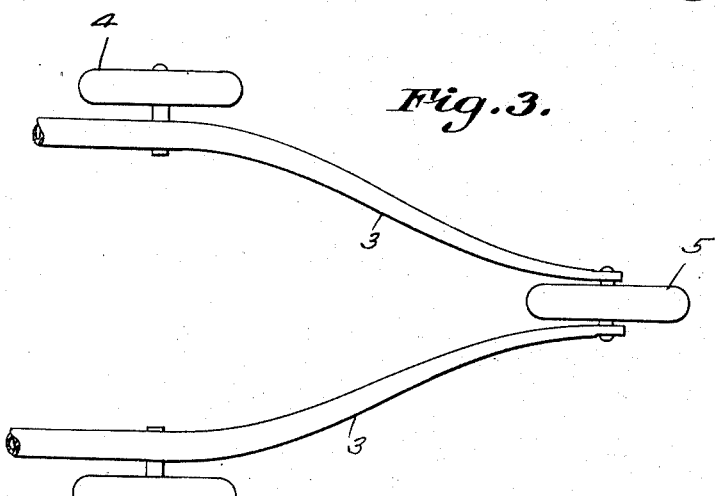

Patented Sept. 19, 1950

2,522,744

UNITED STATES PATENT OFFICE 2,522,744

SCOOTER

Leighton Budd, Brooklyn, N. Y.

Application September 3, 1947, Serial No. 771,964

1 Claim. (Cl. 280—62)

This invention relates to improvements in play cars of the scooter type, and more particularly to the provision of a three-wheeled device which can be easily and conveniently manipulated.

It is the normal posture of man to be upright, and as a consequence the abdominal organs do not function as well as when the body is horizontal. The imperfect functioning of the digestive organs often leads to ruptures, drop stomach, enlarged waist line, flabby abdominal muscles and the like.

It is, therefore, an object of this invention to provide a three wheeled vehicle on which the rider rests with his body in a substantially horizontal position. The device can be built in various sizes to accommodate adults as well as children.

A further object is to provide a play car of rugged construction with few parts to get out of order, and which can be readily manipulated by anyone without instruction.

These and other objects are attained by the novel construction and arrangement of parts hereinafter described and illustrated by the accompanying drawings, forming a part hereof, and in which:

Fig. 1 is a side view of a vehicle embodying the invention.

Fig. 2 is a plan view of a section of the vehicle showing a body supporting strap.

Fig. 3 is a plan view of a portion of the frame of the vehicle, showing an alternate arrangement for supporting a front wheel.

Fig. 4 is a rear view of a vehicle embodying the invention.

Fig. 5 is a side view of a modified form of the device.

Referring to the drawings, the vehicle or play car is shown to comprise a tube or rod 1 bent to form a horizontal portion or loop with body supporting straps 6 attached to loops 7 on side members of the loop. The loop continues to a downwardly extending portion 2 which is connected to lower horizontal members 3, the ends of which support a rear wheel 5, and at the lower portions of members 2 are mounted wheels 4. It will be seen that the device has three wheels which provide a three point support.

In operation, the user lies horizontally on his stomach on the straps 6 and propells the device by his feet. When coasting, the feet are raised from the ground.

Fig. 3 is a modified construction wherein, the members 3 are shown curved. As an alternative form, the members 3 can be straight as indicated in Fig. 1. In Fig. 5 is shown a modified form of the invention in which the loop portion 1 has a downwardly extending bar 8 which is substantially horizontal with the ground and adapted to assist in supporting the body.

From the above description it will be seen that there has been provided a simple and effective vehicle which can be easily and conveniently propelled by the legs of a user, and has means for comfortably supporting the body in a horizontal position when coasting.

The above description is to be considered as illustrative and not limitative of the invention of which modifications can be made without departing from the spirit and scope of the appended claim.

The invention having been described, what is claimed is:

A scooter, comprising a bar bent to form a substantially U-shaped horizontal loop, the legs thereof being further bent to provide two downwardly extending portions and further bent to provide two horizontal converging portions substantially parallel to the U-shaped loop and extending beyond the ends thereof, straps connected to the sides of the U-shaped loop, a pair of wheels mounted at the rear of the horizontal converging portions, and a single wheel mounted on the forward extremities of the horizontal converging portions, said single wheel being mounted beyond the horizontal loop.

LEIGHTON BUDD.

REFERENCES CITED

The following references are of record in the file of this patent:

UNITED STATES PATENTS

| Number | Name | Date |
|---|---|---|
| 110,698 | Tuthill | Jan. 3, 1871 |
| 922,841 | Bernstein | May 25, 1909 |
| 1,364,686 | Behm | Jan. 4, 1921 |
| 1,727,759 | Fageol | Sept. 10, 1929 |
| 1,746,950 | Leonard | Feb. 11, 1930 |
| 1,927,710 | Lindsay | Sept. 10, 1933 |
| 2,432,489 | Schultheis | Dec. 9, 1947 |
| 2,435,022 | Troendle | Jan. 27, 1948 |

FOREIGN PATENTS

| Number | Country | Date |
|---|---|---|
| 66,119 | Austria | Aug. 10, 1914 |
| 804,243 | France | July 27, 1936 |